(12) United States Patent
Rentschler et al.

(10) Patent No.: US 8,878,375 B2
(45) Date of Patent: *Nov. 4, 2014

(54) DEVICE FOR STARTING AN INTERNAL COMBUSTION ENGINE OF A MOTOR VEHICLE USING AN IMPROVED CONTROL UNIT

(75) Inventors: Simon Rentschler, Chang sha (CN); Juergen Gross, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 261 days.

This patent is subject to a terminal disclaimer.

(21) Appl. No.: 13/320,704

(22) PCT Filed: Jun. 11, 2010

(86) PCT No.: PCT/EP2010/058197
§ 371 (c)(1),
(2), (4) Date: Jan. 27, 2012

(87) PCT Pub. No.: WO2011/015400
PCT Pub. Date: Feb. 10, 2011

(65) Prior Publication Data
US 2012/0119517 A1  May 17, 2012

(30) Foreign Application Priority Data
Aug. 6, 2009  (DE) .......................... 10 2009 028 292

(51) Int. Cl.
*F02N 11/08*  (2006.01)

(52) U.S. Cl.
CPC .......... *F02N 11/087* (2013.01); *F02N 11/0814* (2013.01); *Y02T 10/48* (2013.01); *F02N 2011/0892* (2013.01)
USPC ....................................... 290/38 R; 123/179.1

(58) Field of Classification Search
USPC ...................................... 123/179.1; 290/38 R
See application file for complete search history.

(56) References Cited

U.S. PATENT DOCUMENTS

| 2,814,732 | A | * | 11/1957 | McFarland | 290/30 R |
| 3,774,047 | A | * | 11/1973 | Erwin, Jr. | 290/38 R |
| 6,104,157 | A | * | 8/2000 | Kramer et al. | 318/445 |
| 6,987,656 | B2 | * | 1/2006 | Nakamura et al. | 361/104 |

(Continued)

FOREIGN PATENT DOCUMENTS

| CN | 101258322 | 9/2008 |
| DE | 19811176 | 4/1999 |

(Continued)

OTHER PUBLICATIONS

English translation of EP 0 848 159 A1.*

(Continued)

*Primary Examiner* — Tulsidas C Patel
*Assistant Examiner* — Sean Gugger
(74) *Attorney, Agent, or Firm* — Kenyon & Kenyon LLP

(57) ABSTRACT

A device for starting an internal combustion engine of a motor vehicle is described, which has a starter motor, an engaging relay, a starting current relay, a main current relay, a control unit and a switching module situated between the relays named and the control unit. The control unit is an engine control unit of the motor vehicle. The switching module has inputs which are connected to one output, respectively, of the engine control unit, and has outputs at which control signals for the relays named are provided. The outputs of the engine control unit are small signal outputs.

27 Claims, 2 Drawing Sheets

(56) References Cited

U.S. PATENT DOCUMENTS

| | | |
|---|---|---|
| 7,156,063 B2 | 1/2007 | Denz |
| 2005/0139181 A1* | 6/2005 | Denz .......................... 123/179.3 |
| 2006/0152083 A1* | 7/2006 | Fuhr et al. .................... 307/10.1 |
| 2008/0211641 A1* | 9/2008 | Murray et al. ........... 340/426.12 |
| 2008/0283012 A1 | 11/2008 | Wanner |
| 2010/0299053 A1* | 11/2010 | Okumoto et al. ............. 701/113 |
| 2011/0118962 A1* | 5/2011 | Couetoux et al. ............. 701/113 |

FOREIGN PATENT DOCUMENTS

| | | |
|---|---|---|
| DE | 19811176 A1 * | 4/1999 |
| DE | 10 2006 047 608 | 4/2008 |
| DE | 102009000125 | 7/2010 |
| EP | 0 848 159 A1 * | 9/1997 |
| EP | 0848159 | 6/1998 |
| WO | WO 03081026 | 10/2003 |
| WO | WO 2009083477 A9 * | 2/2010 |

OTHER PUBLICATIONS

International Search Report, PCT International Application No. PCT/EP2010/058197, dated Oct. 7, 2010.

* cited by examiner

DEVICE FOR STARTING AN INTERNAL COMBUSTION ENGINE OF A MOTOR VEHICLE USING AN IMPROVED CONTROL UNIT

FIELD OF THE INVENTION

The present invention relates to a device for starting an internal combustion engine of a motor vehicle.

BACKGROUND INFORMATION

For starting internal combustion engines, drives are used that are fed by an energy source that is independent of the fuel supply. DC motors are used, generally whose driving pinions first engage with a toothed rim of the internal combustion engine, in order to actuate the internal combustion engine. At the end of the starting process, the driving pinion disengages again from the toothed rim of the internal combustion engine. In the process, a common relay is used for the engaging process and switching through the main current for driving the DC motor. An associated overview diagram is illustrated in FIG. 1. It shows a relay 1 connected to a terminal 50, a switch 2, a control unit 5, a terminal 30 of the motor vehicle, and a starter motor M. Control unit 5 has a driver TR0 having a switching unit $T_{00}$, which is acted upon by a switching signal $S_{00}$. When switching unit $T_{00}$ is switched through, relay 1 is connected via a control line SLO and terminal 50 to a positive operating voltage +. Thereupon relay 1 operates and closes switch 2. Because of the closing of switch 2, starter motor M is connected to terminal 30 of the motor vehicle and thereby put in operation.

A starting device for starting an internal combustion engine is described in European Patent No. EP 0 848 159 B1, which has a starter motor that is able to be connected to a voltage source via a starter relay, and is able to be brought into engagement with the internal combustion engine for cranking it up. Furthermore, an electronic control unit is provided for actuating the starter relay and/or the starter motor. This controls semiconductor power output stages, assigned to the starter relay and/or the starter motor, in such a way that, at least in a start-stop operation of the internal combustion engine, the starter relay has its engaged position in a start-stop condition of the internal combustion engine. In this starting device, the starter relay has current applied to it after the operation of a starter switch, so that, on the one hand, a contact is closed which connects the starter motor to a supply voltage and, on the other hand, independently of that, engages the pinion of the starter motor with a toothed rim that is situated on the crankshaft of the internal combustion engine.

German Patent Application No. DE 10 2009 000 125.5 describes a device for actuating an electromagnetic switching element, particularly a relay, in which the time that elapses between the triggering of the operating and the operating, and also the time that elapses between the triggering of the dropping off and the dropping off, is reduced. Such a relay may be used in connection with pinion starter-based start-stop systems. To actuate such a relay, three control lines are provided via which a control unit actuates switching elements which, as a function of its switching position, permit or block current flow through two coils of the relay that are able to have current applied to them independently of each other.

An increasing spreading in the market for motor vehicles has start-stop functionality, is connected with broadened requirements on the starting system of the motor vehicle, and also with the broadening of the functions. In particular, at each starting requirement by the driver, the starting capability of the vehicle has to be assured. Moreover, it has to be assured that, during starting, no voltage dips occur, or only slight ones. This may be achieved in that the main current for the starter motor is guided via a series resistor, for one, and time-delayed directly to the starter motor, for another. This makes a separation of the functionalities of a usual starter relay necessary. One approach to this is to provide a first relay for engaging the driving pinion, and to use two additional relays in order to guide the main current for the starter motor, for one thing, via a series resistor and, for another thing, time-delayed directly to the DC motor.

SUMMARY

An example device for starting an internal combustion engine of a motor vehicle in accordance with the present invention may have the advantage that neither costly changes of a usual engine control unit have to be undertaken, nor is an additional stand-alone control unit required for actuating the relays of the device used for a starting process. This is advantageously achieved in that small signal outputs of the engine control unit of the respective motor vehicle are used in order, via a switching module, to provide control signals for the engaging or meshing relay, the main current relay and, provided it is present in the respective application, the starting current relay.

Altogether five small signal outputs of the engine control unit are preferably provided for supplying control signals to the switching module.

In an advantageous manner, the switching module has a series relay, two series relays being assigned respectively to the engaging relay, the starting current relay and the main current relay. These series relays act upon the switch, so as to connect the pull-in winding and the hold-in winding of the respective relay at a time desired in each case to a positive operating voltage. This operating voltage is preferably a voltage derived from terminal 15 of the motor vehicle.

In order to achieve high switching accuracies of starting current relay KA and main current relay KH, the pull-in winding of this relay is low-resistant in each case and the respectively associated hold-in winding is developed to be of higher resistance than the respectively associated pull-in winding, the pull-in winding having in each case the same number of turns as the hold-in winding.

The switching on of the current path by the starting current relay and the main current relay takes place by an actuation on the part of the engine control unit of the respectively associated series relay. Because of this, the respective pull-in winding and the respective hold-in winding have current applied to them at the same time. In an advantageous manner, this results in a high pull-in magnetomotive force, and thus a rapid switching in of the respective relay.

After the pull-in time of the respective second series relay, the respective pull-in winding is switched to currentless, since then both terminals of the respective pull-in winding are connected to the positive operating voltage or to terminal 15 of the motor vehicle.

Switching off the current is initiated by the dropping out of the respectively first series relay. The series circuit of the pull-in winding and the hold-in winding of the respective relay subsequently has a current I flowing through it. This does not, however, produce any magnetomotive force, since the number of windings of the pull-in winding and the hold-in winding of the respective relay is the same and the directions of the current flow through the respective hold-in winding and the respective pull-in winding are in the opposite direction, respectively. For this reason, a very rapid dropping out of the starting current relay and the main current relay takes place. After the dropping out of the respective second series relay, current I dies away.

As was noted above, the engaging relay also has two different windings. However, the primary focus of the engaging relay is not on rapid switching on and off, but is directed at a possible apportioning of the force level in three stages. For this purpose, the number of turns of the two windings are preferably different. The hold-in winding of the engaging relay is optimized to produce a secure retention in the engaged or meshed state of the driving pinion, at minimum power loss. The pull-in winding of the engaging relay is optimized for meshing in the running down of the engine, so as to provide in each case a suitable force level to form a low-noise engaging of the driving pinion with the toothed rim on the crankshaft of the internal combustion engine. A parallel operation is possible if rapid meshing is desired, such as during a cold start.

DETAILED DESCRIPTIONS OF EXAMPLE EMBODIMENTS

Figure 1:
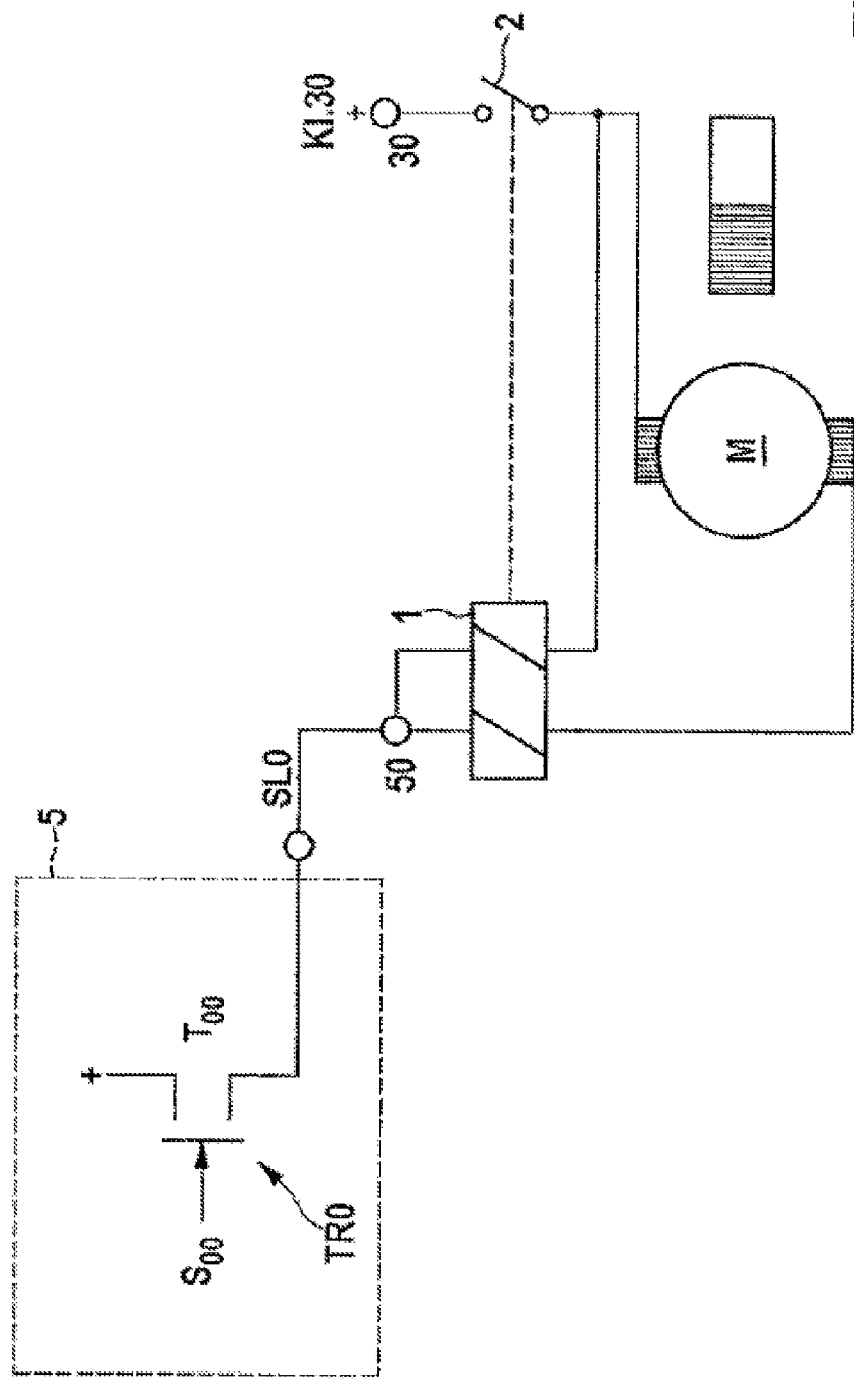
FIG. 1 shows an overview diagram of a relay used for engaging driving pinions and switching through the main current for driving a DC motor.
Figure 2:
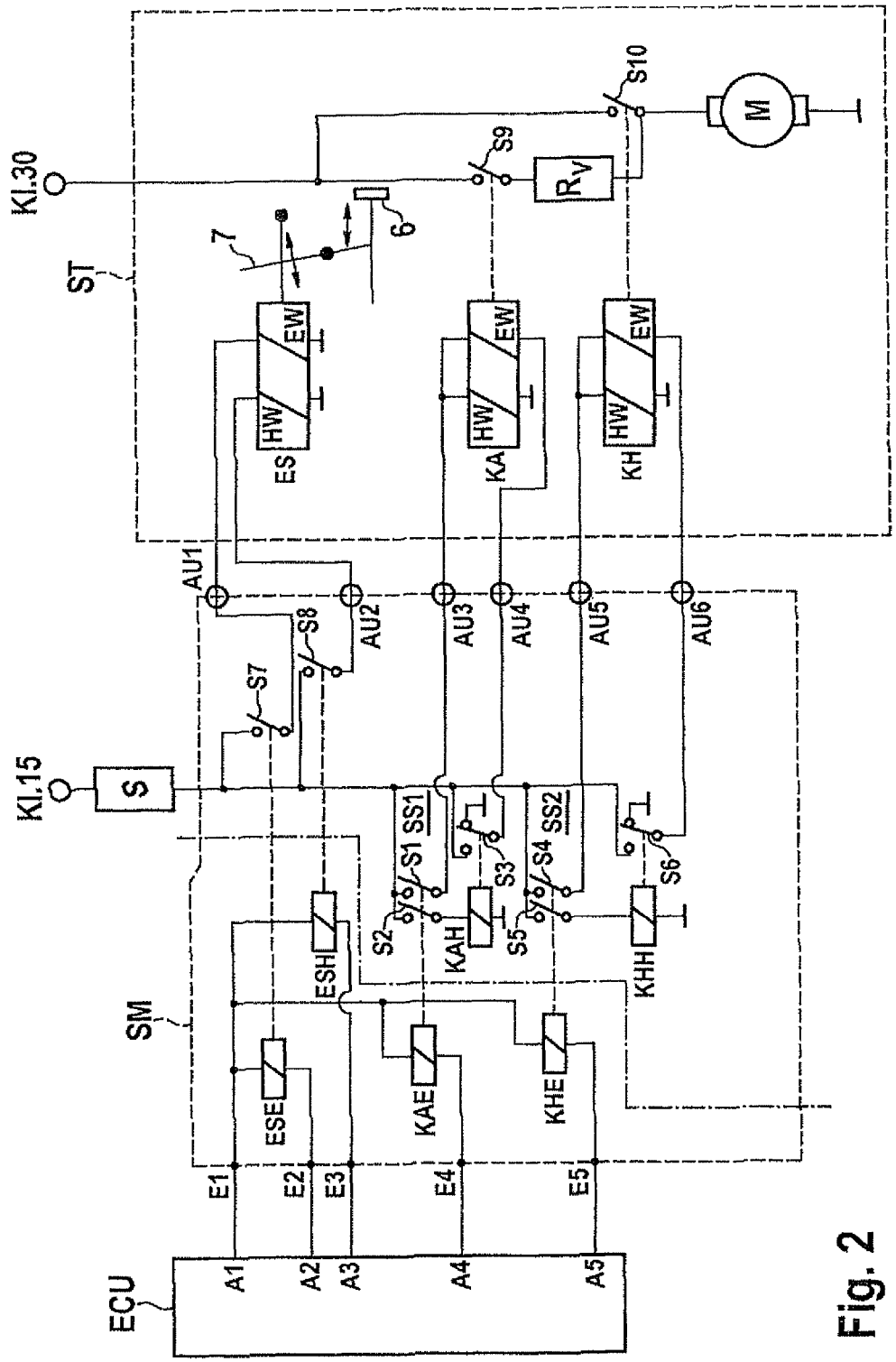
FIG. 2 shows an example embodiment of the present invention.

An exemplary embodiment is explained with reference to FIG. 2. The device shown there for starting an internal combustion engine of a motor vehicle has an engine control unit ECU, a switching module SM and a starter ST.

Engine control unit ECU has altogether five small signal outputs the are designated as A1, A2, A3, A4 and A5. At these small signal outputs, engine control unit ECU provides control signals for switching module SM that is situated between engine control unit ECU and starter ST. The amperages of these control signals are less than 1 A.

Starter ST has an engaging relay ES, a starting current relay KA, a main current relay KH, a driving pinion 6, an engaging lever 7, a series resistor Rv, a starter motor M, a switch S9 and a switch S10. Engaging relay ES, starting current relay KA and main current relay KH are each equipped with a pull-in winding EW and a hold-in winding HW. Pull-in winding EW of starting current relay KA is developed to have a low resistance, hold-in winding HW of starting current relay KH is developed to have a higher resistance than pull-in winding EW of starting current relay KA. Pull-in winding EW of main current relay KH is developed to have a low resistance, hold-in winding HW of main current relay KH is developed to have a higher resistance than pull-in winding EW of main current relay KH. The number of turns of pull-in winding EW of starting current relay KA agrees with the number of turns of hold-in winding HW of starting current relay KA. The number of turns of pull-in winding EW of main current relay KH agrees with the number of turns of hold-in winding HW of main current relay KH. The sense of winding of the pull-in winding and the hold-in winding are respectively opposed.

Engaging relay ES is provided for engaging driving pinion 6 with a toothed rim on the crankshaft of the internal combustion engine. Starting current relay KA is provided for closing a switch S9 provided in the starting current path at a first point in time specified by engine control unit ECU, and thereby to connect terminal 30 of the motor vehicle to starter motor M via series resistor $R_v$, in order to supply starter motor M with a starting current. Main current relay KH is provided to close a switch S10 provided in the main current path, at a second point in time, which lies after the first point in time mentioned, that is specified by engine control unit ECU, and thereby to connect terminal 30 of the motor vehicle directly to starter motor M. Because of this separation of the engaging process of the pinion from the drive of the starter motor and from the drive of the crankshaft of the internal combustion engine, the starting process of the motor vehicle is improved. In particular, a gentler and low-noise, but still rapid start of the starter motor takes place at a time desired by the driver.

The actuation of engaging relay ES, of starting current relay KA and of main current relay KH, i.e., the activation of their pull-in windings and hold-in windings takes place via outputs AU1, ..., AU6 of switching module SM.

Within switching module SM, a first series relay ESE, a second series relay ESH, a single switch S7 and a single switch S8 are assigned to engaging relay ES. One terminal of first series relay ESE is connected via input E1 of switching module SM to output A1 of engine control unit ECU, and the other terminal of first series relay ESE via input E2 of switching module SM to output A2 of engine control unit ECU. One terminal of second series relay ESH is connected via input E1 of switching module SM to output A1 of engine control unit ECU, and the other terminal of second series relay ESH via input E3 of switching module SM to output A3 of engine control unit ECU.

First series relay ESE acts on single switch S7. In the closed state of switch S7, a terminal of pull-in winding EW of engaging relay ES is connected via output AU1 of switching module SM to the positive operating voltage present at terminal 15 of the motor vehicle. The other terminal of pull-in winding EW is at ground. Second series relay ESH acts on single switch S8. In the closed state of switch S8, a terminal of pull-in winding HW of engaging relay ES is connected via output AU2 of switching module SM to the positive operating voltage present at terminal 15 of the motor vehicle. The other terminal of hold-in winding HW of engaging relay ES is at ground.

Engine control unit ECU, via its small signal outputs A1, A2 and A3, actuates series relay ESE and ESH in such a way that, using the engaging relay, an optimized, noise-reduced engaging of the driving pinion takes place, which, in the case of a start-stop operation, is preferably undertaken during the running down of the engine, and that in the engaged state, at minimum power loss, the secure holding of the engaged pinion in the toothed rim on the crankshaft is assured.

Within switching module SM, a first series relay KAE, a second series relay KAH, a double switch SS1 having two switching contacts S1 and S2, and a single switch S3 are assigned to starting current relay KA. One terminal of first series relay KAE is connected via input E1 of switching module SM to output A1 of engine control unit ECU, and the other terminal of first series relay KAE via input E4 of switching module SM to output A4 of engine control unit ECU. One terminal of second series relay KAH, which is situated galvanically separated from first series relay KAE, is connected to terminal 15 of the motor vehicle, at closed second switching contact S2 of double switch SS1. The other terminal of second series relay KAH is at ground. Second series relay KAH acts on a single switch S3. In a first switching position of switch S3, the lower terminal, in FIG. 2, of pull-in winding EW of starting current relay KA is connected to ground via output AU4 of switching module SM. In the other switching position of switch S3, the lower terminal, in FIG. 2, of pull-in winding EW of starting current relay KA is connected to terminal 15 of the motor vehicle via output AU4 of switching module SM. At closed first switching contact S1 of first double switch SS1, the upper terminals, in FIG. 2, of hold-in winding HW and of pull-in winding EW of starting current relay KA are connected via output AU3 of switching module SM to terminal 15 of the motor vehicle, so that pull-in winding EW and hold-in winding HW of starting current relay KA have current applied to them simultaneously upon the closing of first switching contact S1 of double switch SS1.

Via its small signal outputs A1 and A4, engine control unit ECU actuates first series relay KAE in such a way that the two switching contacts S1 and S2 of double switch SS1 are closed at the same time. Because of the closing of first switching contact S1, current is applied first simultaneously to pull-in winding EW and hold-in winding HW of starting current relay KA.

This leads to a high pull-in magnetomotive force, and with that, to a rapid switching in of starting current relay KA. Because of the closing of second switching contact S2, second series relay KAH is activated. After its pull-in time, pull-in winding EW of starting current relay KA is switched to be currentless, since then its two terminals are connected to terminal 15 of the motor vehicle. The switching off of the current is triggered by a dropping off of first series relay KAE. The series circuit of pull-in winding EW and hold-in winding HW of starting current relay KA subsequently has a current I flowing through it. However, this does not generate a magnetomotive force, since the number of turns of pull-in winding EW agrees with the number of turns of hold-in winding HW of starting current relay KA, and the current directions of these windings are opposite. As a result, a very rapid drop-off of starting current relay KA takes place. After the dropping off of second series relay KAH, current I dies away.

Within switching module SM, a first series relay KHE, a second series relay KHH, a double switch SS2 having two switching contacts S4 and S5, and a single switch S6 are assigned to main current relay KH. One terminal of first series relay KHE is connected via input E1 of switching module SM to output A1 of engine control unit ECU, and the other terminal of first series relay KHE via input E5 of switching module SM to output A5 of engine control unit ECU. One terminal of second series relay KHH, which is situated galvanically separated from first series relay KHE, is connected to terminal 15 of the motor vehicle, at closed second switching contact S5 of double switch SS2. The other terminal of second series relay KHH is at ground. Second series relay KHH acts on a single switch S6. In a first switching position of switch S6, the lower terminal, in FIG. 2, of pull-in winding EW of main current relay KH is connected to ground via output AU6 of switching module SM. In the other switching position of switch S6, the lower terminal, in FIG. 2, of pull-in winding EW of main current relay KH is connected to terminal 15 of the motor vehicle via output AU6 of switching module SM. At closed first switching contact S4 of second double switch SS2, the upper terminals, in FIG. 2, of hold-in winding HW and of pull-in winding EW of main current relay KH are connected via output AU5 of switching module SM to terminal 15 of the motor vehicle, so that pull-in winding EW and hold-in winding HW of main current relay KH have current applied to them simultaneously upon the closing of first switching contact S4 of double switch SS2.

Via its small signal outputs A1 and A5, engine control unit ECU actuates first series relay KHE in such a way that the two switching contacts S4 and S5 of double switch SS2 are closed at the same time. Because of the closing of first switching contact S4, current is applied first simultaneously to pull-in winding EW and hold-in winding HW of starting current relay KH. This leads to a high pull-in magnetomotive force, and with that, to a rapid switching in of starting current relay KH. Because of the closing of second switching contact S5, second series relay KHH is activated. After its pull-in time, pull-in winding EW of main current relay KH is switched to be currentless, since then its two terminals are connected to terminal 15 of the motor vehicle. The switching off of the current is triggered by a dropping off of first series relay KHE. The series circuit of pull-in winding EW and hold-in winding HW of main current relay KH subsequently has a current I flowing through it. However, this does not generate a magnetomotive force, since the number of turns of pull-in winding EW agrees with the number of turns of hold-in winding HW of main current relay KH, and the current directions of these windings are opposite. As a result, a very rapid drop-off of main current relay KH takes place. After the dropping off of second series relay KHH, current I dies away.

According to another specific embodiment of the present invention, in which the current branch having the series resistor is not provided, starting current relay KA and series relay KAB and KAH, associated with it, are also omitted. In this other specific embodiment, the actuation of switching module SM takes place via the four small signal outputs A1, A2, A3 and A5. Small signal output A4 may also be omitted in this other specific embodiment.

What is claimed is:

1. A device for starting an internal combustion engine of a motor vehicle, comprising:
   a starter motor;
   a starting current relay;
   an engaging relay configured to control engagement of a driving pinion independently of the starter motor;
   a main current relay;
   an engine control unit of the motor vehicle; and
   a switching module situated between (a) the engaging relay and the main current relay and (b) the engine control unit;
   wherein the switching module includes:
      inputs which are connected to outputs of the engine control unit; and
      outputs at which control signals are provided for the engaging relay and the main current relay.

2. The device as recited in claim 1, wherein the engine control unit is connected to the switching module via five small signal outputs.

3. The device as recited in claim 1, wherein the starting current relay, the main current relay, and the engaging relay each have a pull-in winding and a hold-in winding.

4. The device as recited in claim 3, wherein the pull-in winding of the starting current relay is of lower resistance than the hold-in winding of the starting current relay, the pull-in winding of the main current relay is of lower resistance than the hold-in winding of the main current relay, a number of turns of the pull-in winding of the starting current relay is equal to a number of turns of the hold-in winding of the starting current relay, and a number of turns of the pull-in winding of the main current relay is equal to a number of turns of the hold-in winding of the main current relay.

5. The device as recited in claim 1, wherein the switching module has a first series relay assigned to the engaging relay, a first series relay assigned to the starting current relay and a first series relay assigned to the main current relay.

6. The device as recited in claim 5, wherein the switching module has a second series relay assigned to the engaging relay, a second series relay assigned to the starting current relay and a second series relay assigned to the main current relay.

7. The device as recited in claim 1, wherein the starter motor and engaging relay are arranged for connection of the starter motor to a positive voltage source without the engaging relay affecting the connection.

8. The device as recited in claim 1, wherein the engine control unit is configured for outputting, at respective ones of the outputs of the engine control unit, respective signals of less than 1 ampere.

9. The device as recited in claim 8, wherein the control signals provided for the engaging relay and the main current relay are based on the signals of less than 1 ampere.

10. The device as recited in claim 1, wherein:
the starting current relay is configured to connect the starter motor to a voltage source via a series resistor; and
the main current relay is configured to direct connect the starter motor to the voltage source without the voltage passing through any series resistor.

11. The device as recited in claim 10, wherein, for the connection of the starter motor to the voltage source via the series resistor, the device is configured to close a first switch and a second switch, and, for the direct connection of the starter motor to the voltage source, the device is configured to close the second switch while the first switch is open.

12. The device as recited in claim 1, wherein the each of the starting current relay and the main current relay are configured to be controlled for affecting a connection of the starter motor to a voltage source.

13. A device for starting an internal combustion engine of a motor vehicle, comprising:
a starter motor;
an engaging relay provided for engaging a driving pinion;
a main current relay;
a starting current relay;
an engine control unit of the motor vehicle;
a switching module situated between (a) the engaging relay and the main current relay, and (b) the engine control unit;
wherein:
the switching module includes:
inputs which are connected to outputs of the engine control unit;
outputs at which control signals are provided for the engaging relay and the main current relay;
a first series relay assigned to the engaging relay;
a first series relay assigned to the starting current relay; and
a first series relay assigned to the main current relay;
the first series relay assigned to the starting current relay is configured to act upon a first switching contact of a first double switch;
the device is configured for a first terminal of a hold-in winding of the starting current relay and a first terminal of a pull-in winding of the starting current relay to be connected to a positive DC voltage source in response to the first switching contact of the first double switch being closed.

14. The device as recited in claim 13, wherein the switching module includes a second series relay assigned to the engaging relay, a second series relay assigned to the starting current relay, and a second series relay assigned to the main current relay.

15. The device as recited in claim 14, wherein the first series relay assigned to the starting current relay is configured to act upon a second switching contact of the first double switch, and the device is configured for the second series relay of the starting current relay to be connected to the positive DC voltage source in response to the second switching contact being closed.

16. The device as recited in claim 15, wherein:
the second series relay of the starting current relay is configured to act upon a first single switch;
the first single switch is configured to:
when in a first switching position, connect a second terminal of the pull-in winding of the starting current relay to ground; and
when in a second switching position, connect the second terminal of the pull-in winding of the starting current relay to the positive DC voltage source.

17. The device as recited in claim 13, wherein the engine control unit is configured for outputting, at respective ones of the outputs of the engine control unit, respective signals of less than 1 ampere.

18. A device for starting an internal combustion engine of a motor vehicle, comprising:
a starter motor;
an engaging relay provided for engaging a driving pinion;
a main current relay;
an engine control unit of the motor vehicle;
a switching module situated between (a) the engaging relay and the main current relay, and (b) the engine control unit;
wherein:
the switching module includes:
inputs which are connected to outputs of the engine control unit;
outputs at which control signals are provided for the engaging relay and the main current relay;
a first series relay assigned to the engaging relay; and
a first series relay assigned to the main current relay;
the first series relay assigned to the main current relay is configured to act upon a first switching contact of a double switch; and
the device is configured for a first terminal of a hold-in winding of the main current relay and a first terminal of a pull-in winding of the main current relay to be connected to a positive DC voltage source in response to the first switching contact of the double switch being closed.

19. The device as recited in claim 18, wherein the switching module includes a second series relay assigned to the main current relay, the first series relay assigned to the main current relay is configured to act upon a second switching contact of the double switch, and the device is configured for the second series relay of the main current relay to be connected to the positive DC voltage source in response to the second switching contact being closed.

20. The device as recited in claim 19, wherein:
the switching module includes a second series relay assigned to the main current relay;
the second series relay of the main current relay is configured to act upon a first single switch, which is configured to:
when the first single switch is in a first switching position, connect a second terminal of the pull-in winding of the main current relay to ground; and
when the first single switch is in a second switching position, connect a second terminal of the pull-in winding of the main current relay to the positive DC voltage source.

21. The device as recited in claim 20, wherein:
the first series relay assigned to the engaging relay is configured to act upon a switching contact of a second single switch; and
the device is configured for a first terminal of the pull-in winding of the engaging relay to be connected to the positive DC voltage source in response to the switching contact of the second single switch being closed, and for a second terminal of the pull-in winding of the engaging relay to be connected to ground in response to the switching contact of the second single switch being closed.

22. The device as recited in claim 21, wherein the switching module includes a second series relay assigned to the engaging relay, the second series relay assigned to the engaging relay is configured to act upon a switching contact of a switch, which, when closed is configured to connect:
a first terminal of a hold-in winding of the engaging relay to the positive DC voltage source; and
a second terminal of the hold-in winding of the engaging relay to ground.

23. The device as recited in claim 22, further comprising:
a starting current relay;
wherein:
the switching module includes a first series relay assigned to the starting current relay, a second series relay assigned to the starting current relay, and a second series relay assigned to the main current relay;
the first series relay assigned to the starting current relay within the switching module is situated galvanically separated from the second series relay assigned to the starting current relay; and
the first series relay assigned to the main current relay within switching module is situated galvanically separated from the second series relay assigned to the main current relay.

24. The device as recited in claim 18, further comprising:
a starting current relay, wherein the switching module includes a first series relay assigned to the starting current relay.

25. The device as recited in claim 18, wherein the engine control unit is configured for outputting, at respective ones of the outputs of the engine control unit, respective signals of less than 1 ampere.

26. A device for starting an internal combustion engine of a motor vehicle, comprising:
a starter motor;
the starter motor;
a main current relay;
an engine control unit of the motor vehicle; and
a switching module situated between (a) the engaging relay and the main current relay and (b) the engine control unit;
wherein:
the switching module includes:
inputs which are connected to outputs of the engine control unit; and
outputs at which control signals are provided for the engaging relay and the main current relay; and
the outputs of the engine control unit include:
a shared output configured to be used by the switching module for generation of the control signals of both the main current relay and the engaging relay;
a first unshared output which (a) is configured to be used by the switching module for the generation of the control signal for the main current relay and (b) is not configured to affect the generation of the control signal for the engaging relay; and
a second unshared output which (a) is configured to be used by the switching module for the generation of the control signal for the engaging relay and (b) is not configured to affect the generation of the control signal for the main current relay.

27. A device for starting an internal combustion engine of a motor vehicle, comprising:
a starter motor;
the starter motor;
a main current relay;
an engine control unit of the motor vehicle; and
a switching module situated between (a) the engaging relay and the main current relay and (b) the engine control unit;
wherein:
switching module includes:
inputs which are connected to outputs of the engine control unit; and
outputs at which control signals are provided for the engaging relay and the main current relay;
the outputs of the engine control unit include a shared output configured to be used by the switching module for generation of the control signals of both the main current relay and the engaging relay;
the main current relay is configured to control a connection of the starter motor to a voltage source; and
the engaging relay is not configured to control any connection of the starter motor to the voltage source.

* * * * *